United States Patent [19]

Mochizuki

[11] Patent Number: 5,684,930
[45] Date of Patent: Nov. 4, 1997

[54] OUTPUT APPARATUS AND METHOD WITH FONT CONTROL IN PLURAL OUTPUT MODES

[75] Inventor: Yasushi Mochizuki, Yokohama, Japan

[73] Assignee: Canon Kabushiki Kaisha, Tokyo, Japan

[21] Appl. No.: 662,283

[22] Filed: Jun. 12, 1996

Related U.S. Application Data

[63] Continuation-in-part of Ser. No. 249,363, May 27, 1994, abandoned.

[30] Foreign Application Priority Data

Jun. 1, 1993 [JP] Japan .................................. 5-130496

[51] Int. Cl.$^6$ ...................................................... G06F 15/00
[52] U.S. Cl. ...................................... 395/106; 395/110
[58] Field of Search .................................. 395/110, 106, 395/109, 115, 275; 400/121

[56] References Cited

U.S. PATENT DOCUMENTS

| | | | |
|---|---|---|---|
| 4,901,249 | 2/1990 | Shiota | 364/519 |
| 5,138,696 | 8/1992 | Nagata | 395/110 |
| 5,142,613 | 8/1992 | Morikawa et al. | 395/110 |
| 5,142,614 | 8/1992 | Schneider et al. | 395/115 |
| 5,171,092 | 12/1992 | Tasaki | 400/121 |
| 5,175,821 | 12/1992 | Dutcher et al. | 395/275 |
| 5,201,031 | 4/1993 | Kasaki | 395/110 |
| 5,233,683 | 8/1993 | Sasaki | 395/110 |
| 5,305,428 | 4/1994 | Osawa | 395/110 |
| 5,309,548 | 5/1994 | Ohta et al. | 395/109 |

*Primary Examiner*—Raymond J. Bayerl
*Assistant Examiner*—Steven P. Sax
*Attorney, Agent, or Firm*—Fitzpatrick, Cella, Harper & Scinto

[57] ABSTRACT

Method and apparatus in which a font whose use is intended to be restricted to a particular purpose, such as a specific emulation program, is identified in such manner as to prevent its use otherwise than as intended.

18 Claims, 10 Drawing Sheets

FIG.3

20 EMULATION TABLE

| TABLE NUMBER (21) | ADDRESS OF EMULATION (22) | EMULATION NAME (23) | EMULATION IDENTIFYING NUMBER (24) | OTHER INFORMATION (25) |
|---|---|---|---|---|
| 0 | XXXXXXXX | EMULATION A | 10 | ******** |
| 1 | XXXXXXXX | EMULATION B | 20 | ******** |
| 2 | XXXXXXXX | EMULATION C | 30 | ******** |
| 3 | XXXXXXXX | EMULATION D | 40 | ******** |
| 4 | XXXXXXXX | EMULATION E | 50 | ******** |

30 CHARACTER SET TABLE

| 31 FONT ADDRESS | 32 FONT INFORMATION FLAG | 33 FONT SELECTION ENABLING FLAG | 34 EMULATION FLAG |
|---|---|---|---|
| XXXXXXX | INNER FONT | ON | 0 0 0 0 0 0 0 0 |
| .... | .... | .... | .... |
| XXXXXXX | CARD FONT | ON | 0 0 0 0 0 0 0 0 |
| .... | .... | .... | .... |
| XXXXXXX | EMULATION FONT A | OFF | 0 0 0 0 0 1 1 1 |
| XXXXXXX | EMULATION FONT B | OFF | 0 0 0 0 1 0 1 0 |

34 EMULATION FLAG

| 7 | 6 | 5 | 4 | 3 | 2 | 1 | 0 |

LAY OUT BITS SHOWS EMULATION TABLE NUMBER 21

OUTPUT APPARATUS AND METHOD WITH FONT CONTROL IN PLURAL OUTPUT MODES

This application is a continuation of application Ser. No. 08/249,363, filed May 27, 1994, now abandoned.

BACKGROUND OF THE INVENTION

1. Field of the Invention

The present invention relates to an output apparatus and method capable of specifying at least one useful output mode corresponding to given font data.

2. Related Background Art

There are two types of font in a character output apparatus such as a printing apparatus: ordinary fonts, and exclusive fonts for use by emulation programs. Ordinary fonts include internal fonts, provided in the apparatus, and card fonts supplied by a card. These fonts are stored in a table in the apparatus when power is turned on.

An exclusive font for emulating is permitted to be used in accordance with a specific emulation program. If the characters of such an exclusive font are the same, or nearly the same, in appearance as those of one of the ordinary fonts in the printer (that is, the two fonts may differ only in, e.g., the range of sizes to which characters can be scaled), the exclusive font is stored in the table with the internal font.

If the output apparatus supports an emulation and the exclusive font provided for use with the emulation program is the same, or nearly the same, in appearance as some internal font, that exclusive font may prove to be usable by other emulation programs. In this case, it is difficult to distinguish among these emulation programs, which may give rise to a problem of copyright.

Some output apparatus have a function for storing non-internal-font characters which are produced by users, as font patterns, thus rendering such non-internal-font character patterns available for use as a font for printing whenever desired. A font stored in the table can be used by any processing language. In the case of an output apparatus which can store a non-internal character font and which supports many emulation programs, also, a stored non-internal character font for an specific emulation program can, unfortunately, be used for other emulation programs.

Font format can affect these problems. If each emulation font has a different format from other such fonts, an exclusive font intended for a specific emulation can be used only for that emulation.

SUMMARY OF THE INVENTION

The present invention has been made in consideration of the above situation, and has as one of its objects, to provide an output method and apparatus capable of permitting flexible selection of a font. According to one aspect of the invention, this is done by providing a method and apparatus in which a font is selected in accordance with specific information indicating an output mode (such as an emulation program) which can use a font which includes the specific information.

Another object of the present invention is to provide an output method and apparatus capable of permitting font data to be used in some common output process or to be used in a specific output process. According to another aspect of the invention, this is done by providing a method and apparatus in which a font is used in a common or a special output process in accordance with specific information showing an output mode such as an emulation program which can use a font which includes the specific information.

Another object of the present invention is to provide an output method and apparatus capable of determining whether designated font data can currently be used in an output mode. According to another aspect of the invention, this is done by providing a method and apparatus in which such a determination is made in accordance with specific information which is included in the designated font data.

These and other objects, features and adavantages of the invention will be more fully understood from a consideration of the following detailed description of the preferred embodiments, taken in conjunction with the accompanying drawings, in which like elements are repesented by like reference characters throughout.

BRIEF DESCRIPTION OF THE DRAWINGS

FIG. 3 is a schematic diagram illustrating data in an emulation table.

DETAILED DESCRIPTION OF THE PREFERRED EMBODIMENTS

The preferred embodiments according to the present invention will be described with reference to the accompanying drawings.

[First Embodiment]

Figure 1:
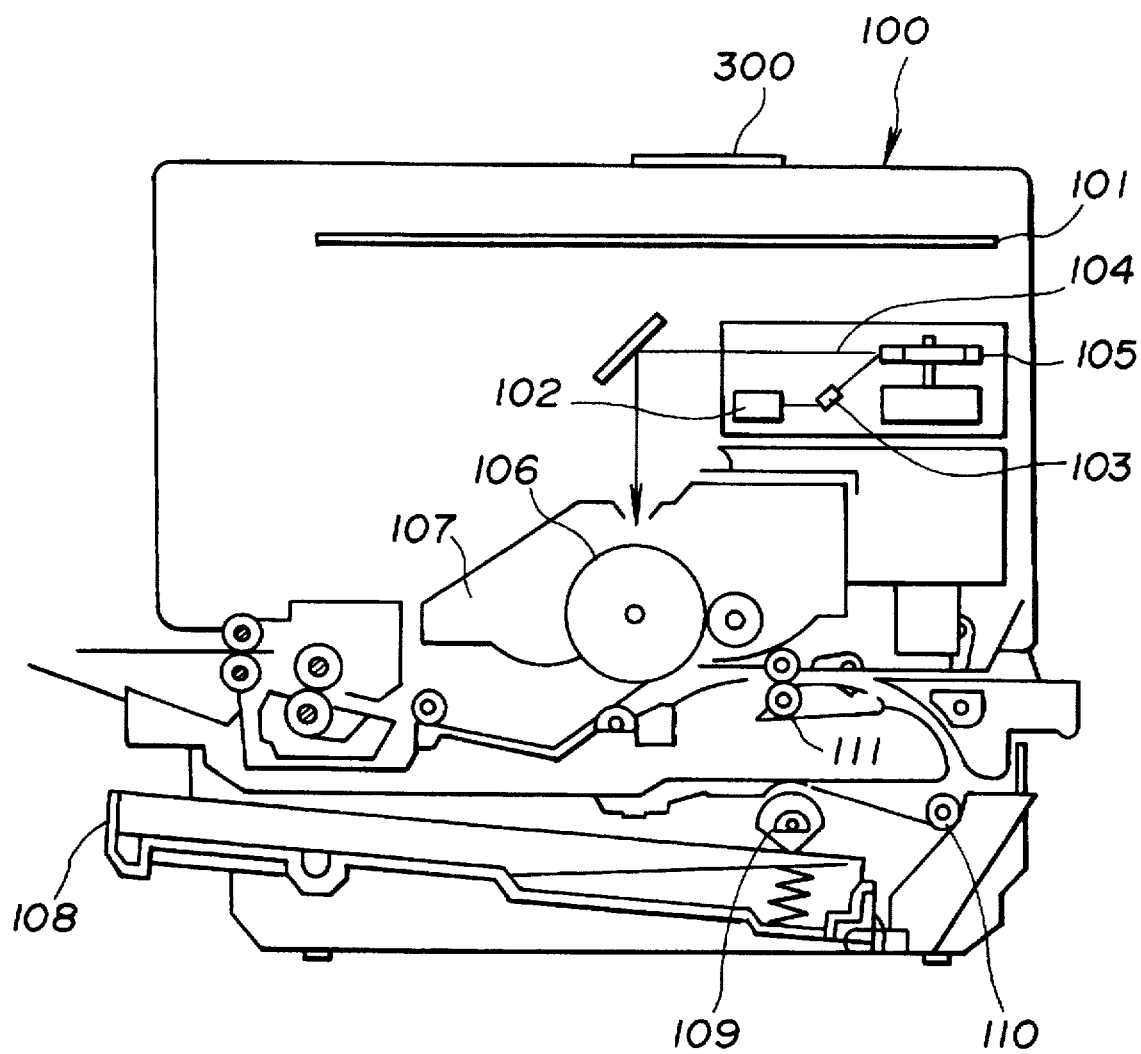
FIG. 1 is a cross-sectional view of a recording apparatus, such as a laser printer.

FIG. 1 is a cross-sectional view of a recording apparatus, such as a laser beam printer, to which the character processing method of the present invention is applicable.

A main body 100 (printer) of the apparatus receives and stores print information (character codes, etc.), from information and macro instructions supplied from an external host computer, generates character patterns (to be generated by the character pattern process of the present invention), forms patterns, and forms an image on a recording sheet serving as a recording medium. There are also shown an operation panel, including switches and LED indicators for various operations, and a printer control unit 101 for controlling the entire printer 100 and analyzing the character information supplied from the host computer. The printer control unit 101 converts the character information into a video signal of corresponding character patterns for supply to a laser driver 102, which drives a semiconductor laser 103 and on-off switches the laser beam 104 emitted from the semiconductor laser 103 according to the input video signal. The laser beam 104 is laterally deflected by a rotary polygonal mirror 105 to scan an electrostatic drum 106, thereby forming an electrostatic latent image of a character pattern thereon. The latent image is developed into a visible image by a developing unit 107 positioned around the electrostatic drum 106, and is transferred onto the recording sheet (a cut sheet stored in a cassette 108 mounted on the main body 100, and supplied therefrom by a feed roller 109, and transport rollers 110 and 111 to the electrostatic drum 106).

The image processing apparatus described above exemplifies a laser beam printer. However, the present invention is not limited to this. The present invention is equally applied to an ink-jet printer, as described below.

Figure 9:
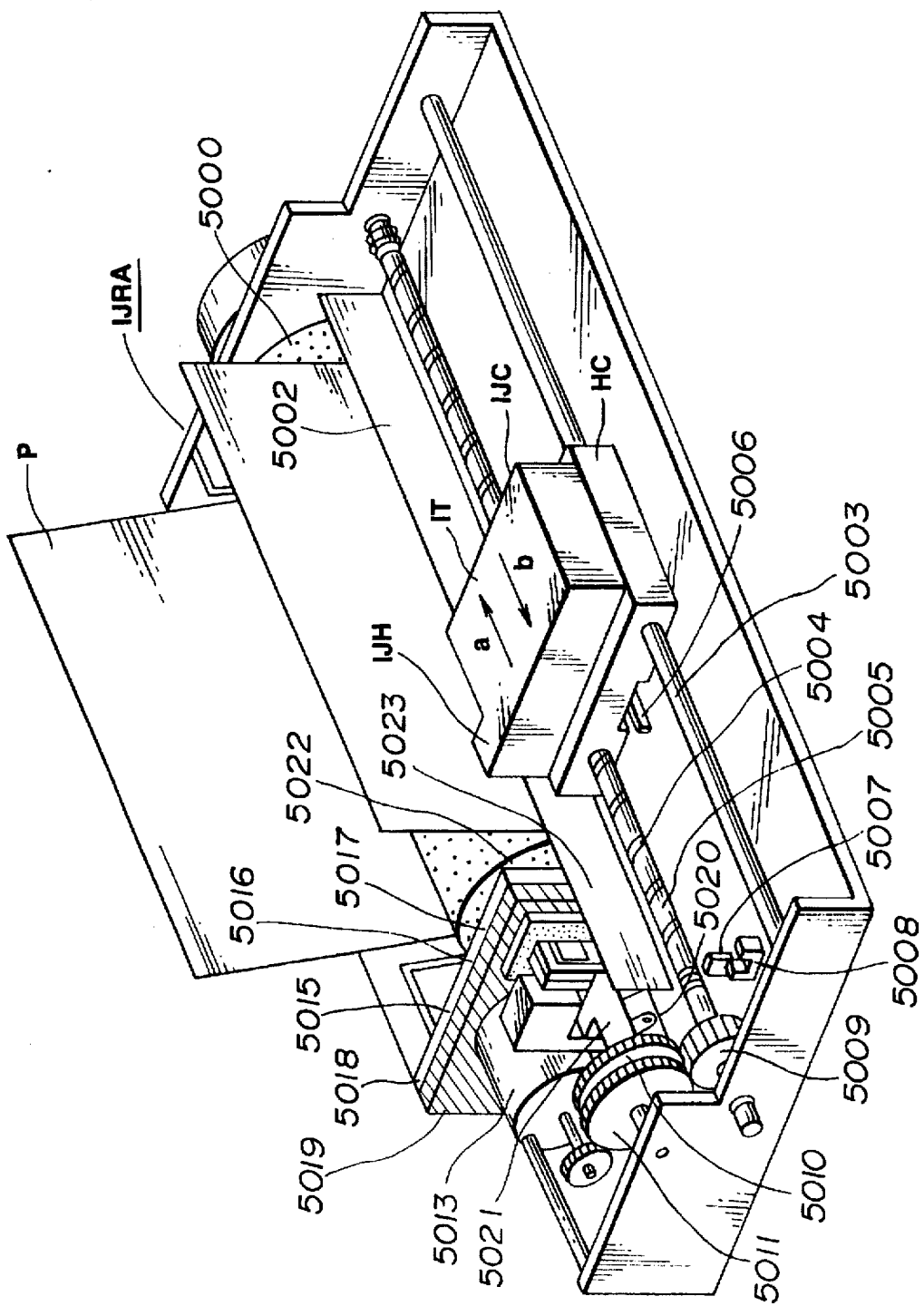
FIG. 9 is a perspective view of an ink jet printer (IJRA).

FIG. 9 is a perspective view of an ink-jet recording apparatus IJRA to which the present invention can be applied. Referring to FIG. 9, a carriage HC engages a helical groove 5005 of a lead screw 5004 rotated interlockingly with normal/reverse rotation of a drive motor 5013 through driving force transmission gears 5011 and 5009 having a pin (not shown) and can be reciprocated in the directions indicated by arrows a and b. An ink-jet cartridge IJC is mounted on the carriage HC. A paper press plate 5002 presses the paper in the carriage movement direction through a platen 5000. A photocoupler 5007 and 5008 is a home position detecting means for detecting the presence of a lever 5006 of the carriage within this range to switch the rotational direction of the motor 5013. A member 5016 supports a cap member 5022 for capping the front surface of a recording head. A suction device 5015 draws the ink from the cap to recover the recording head through an opening 5023 in the cap. A cleaning blade 5017 is moved back and forth by a member 5019, and the cleaning blade 5017 and the member 5019 are supported on a main body support plate 5018. The blade need not have the form shown, but can instead have another known form. A lever 5021 starts suction to recover the recording head. The lever 5021 is moved together with a cam 5020 engaged with the carriage. The driving force from the motor 5013 is controlled by a known transmitting means such as clutch switching.

Capping, cleaning and suction recovery are performed by desired processes at the corresponding positions in accordance with the behavior of the lead screw 5004 when the carriage reaches the home position. If desired operations are performed at known timings, any scheme can be employed in this embodiment.

Figure 10:
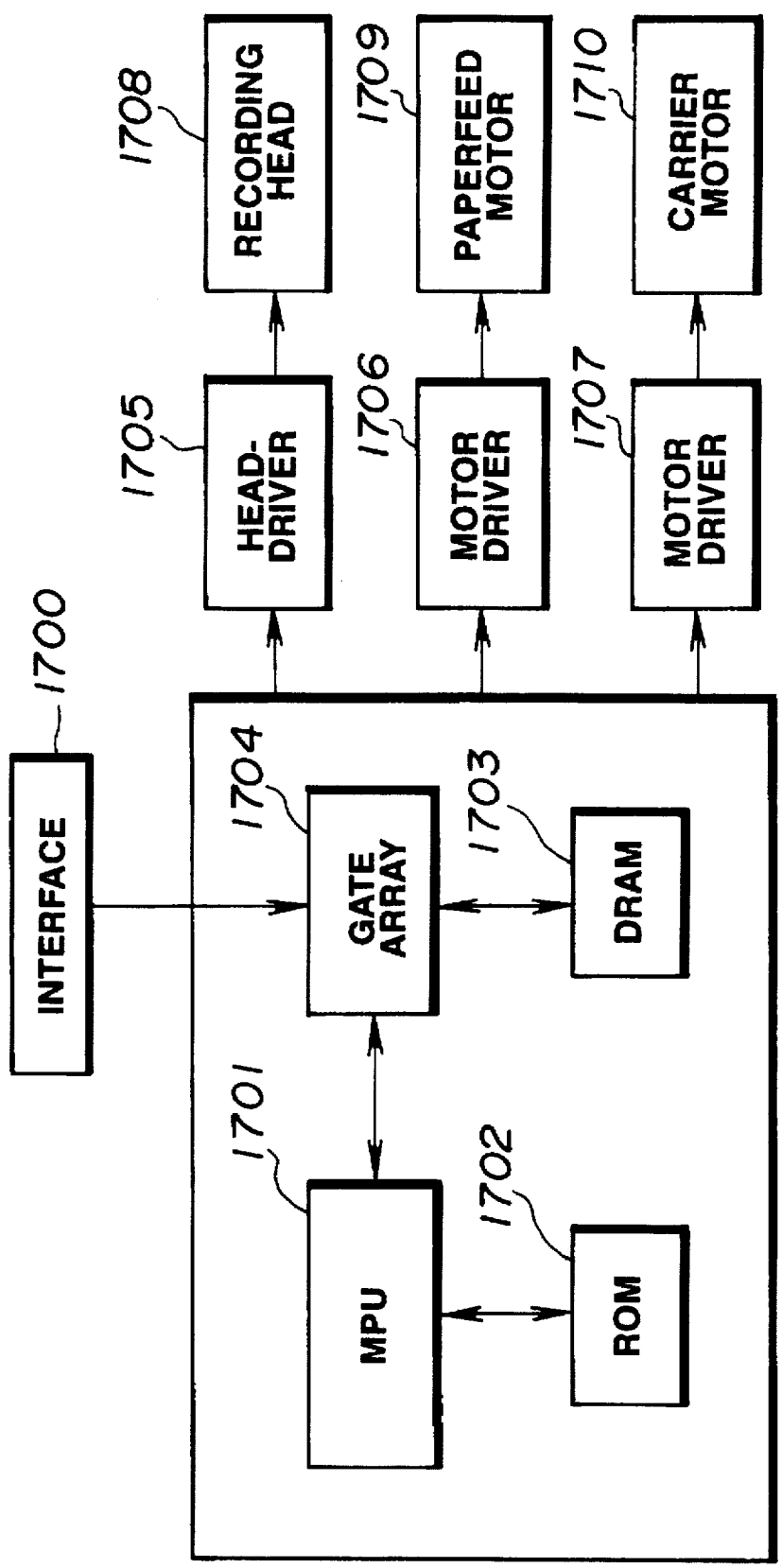
FIG. 10 is a schematic block diagram of a control unit for controlling such an ink jet printing apparatus.

A control arrangement for executing recording control of the respective components in the apparatus will be described with reference to the block diagram in FIG. 10. A control circuit includes an interface 1700 for inputting a recording signal, an MPU 1701, a program ROM 1702 for storing control programs executed by the MPU 1701, a dynamic RAM 1703 for storing various data (e.g., the recording signal and recording data supplied to the head), a gate array 1704 for controlling and supplying the recording data to a recording head 1708 and performing transfer control of data between the interface 1700, the MPU 1701, and the DRAM 1703, a carriage motor 1710 for moving the recording head 1708, a paperfeed motor 1709 for conveying recording sheets, a head driver 1705 for driving the head, and motor drivers 1706 and 1707 for driving the paperfeed motor 1709 and the carriage motor 1710, respectively.

When a recording signal is input to the interface 1700, the recording signal is converted into print recording data by the gate array 1704 and the MPU 1701. The motor drivers 1706 and 1707 are driven to drive the recording head in accordance with the recording data supplied to the head driver 1705, thereby printing the recording information.

It is possible to incorporate the constituent components of the present invention in the control arrangement of the ink-jet printer.

Figure 2:
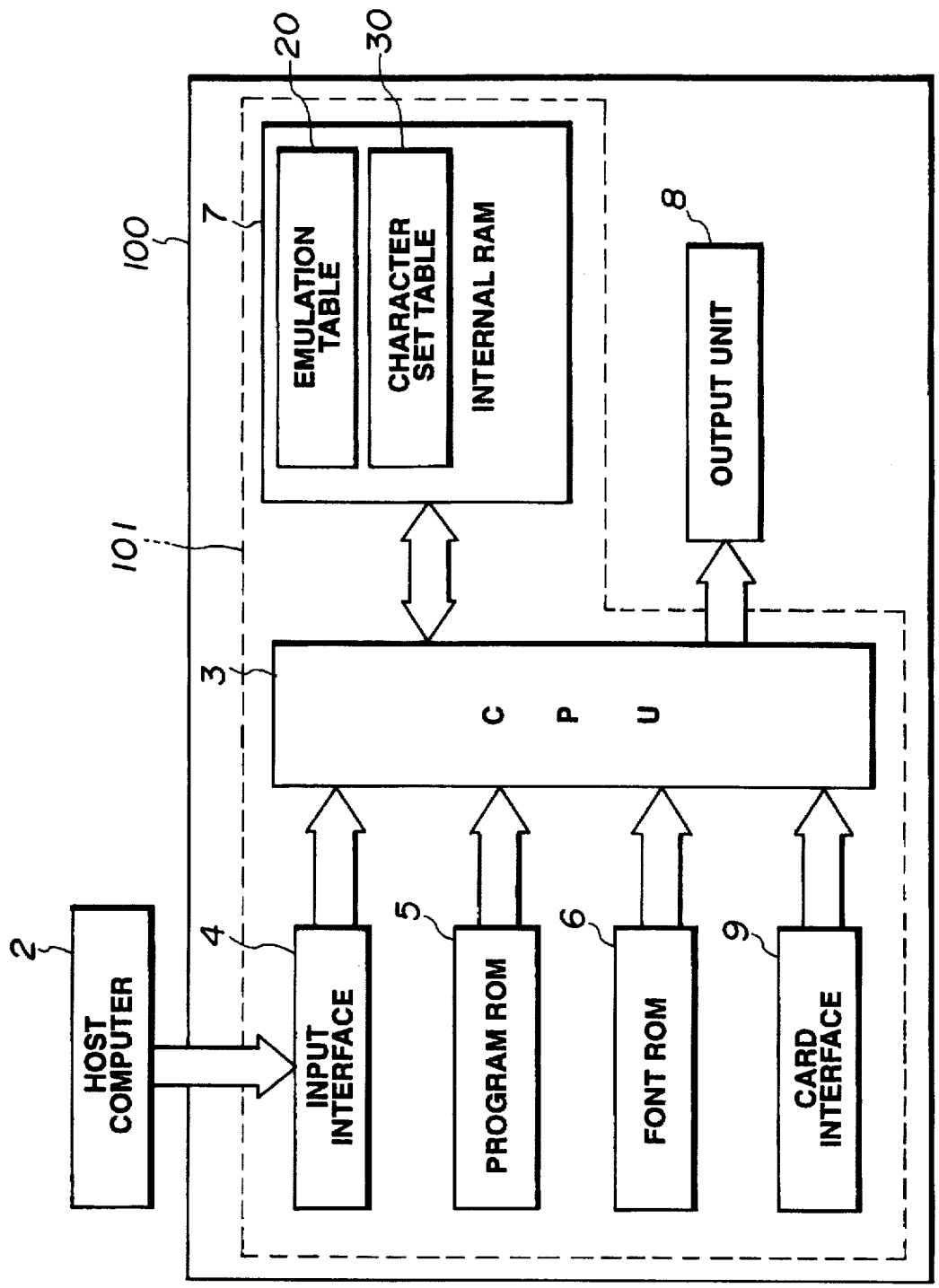
FIG. 2 is a block diagram showing the internal construction of a printing apparatus.
Figure 6:
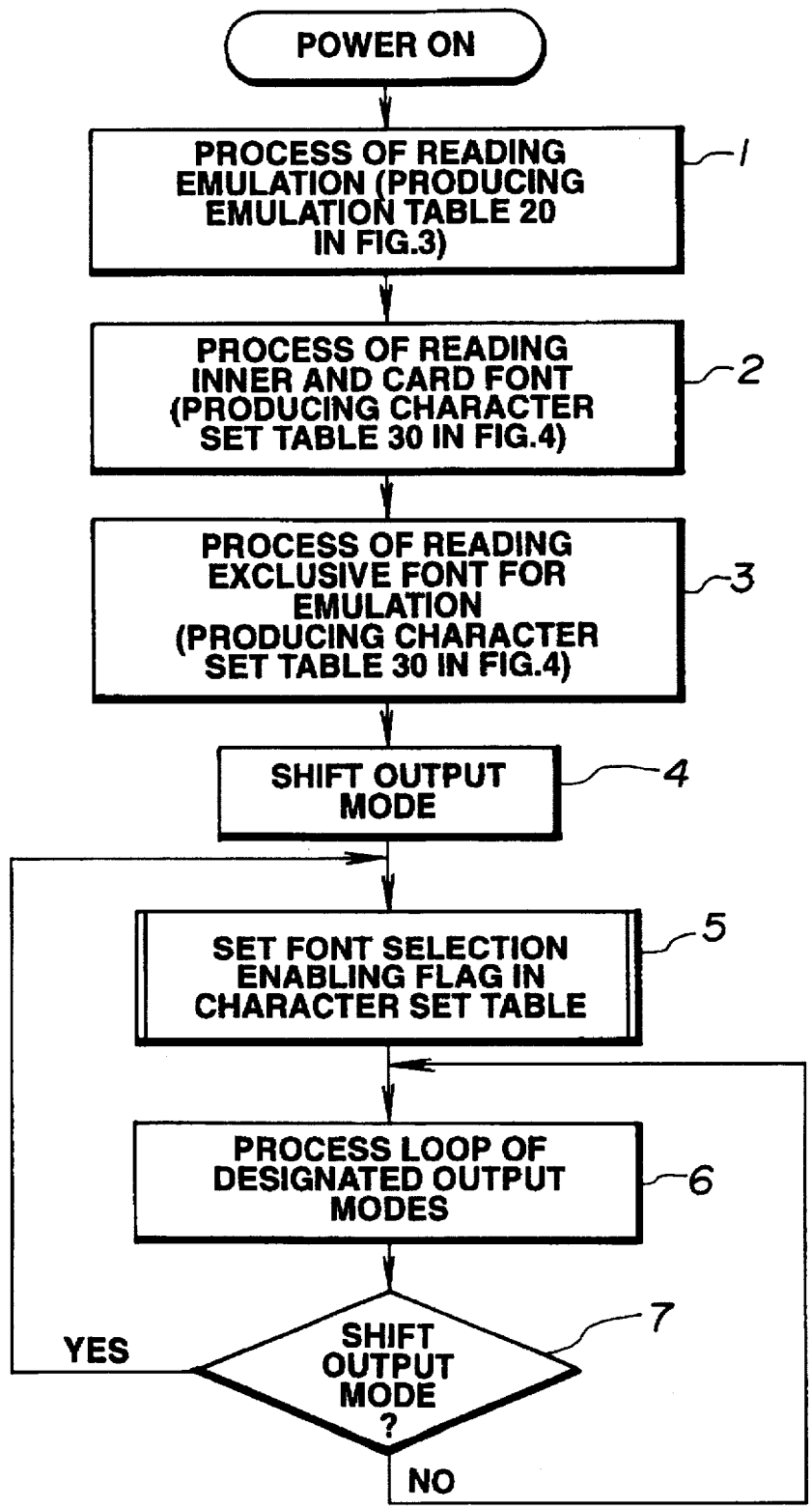
FIG. 6 is a flow chart showing a process of taking exclusive font data in a first embodiment.
Figure 7:
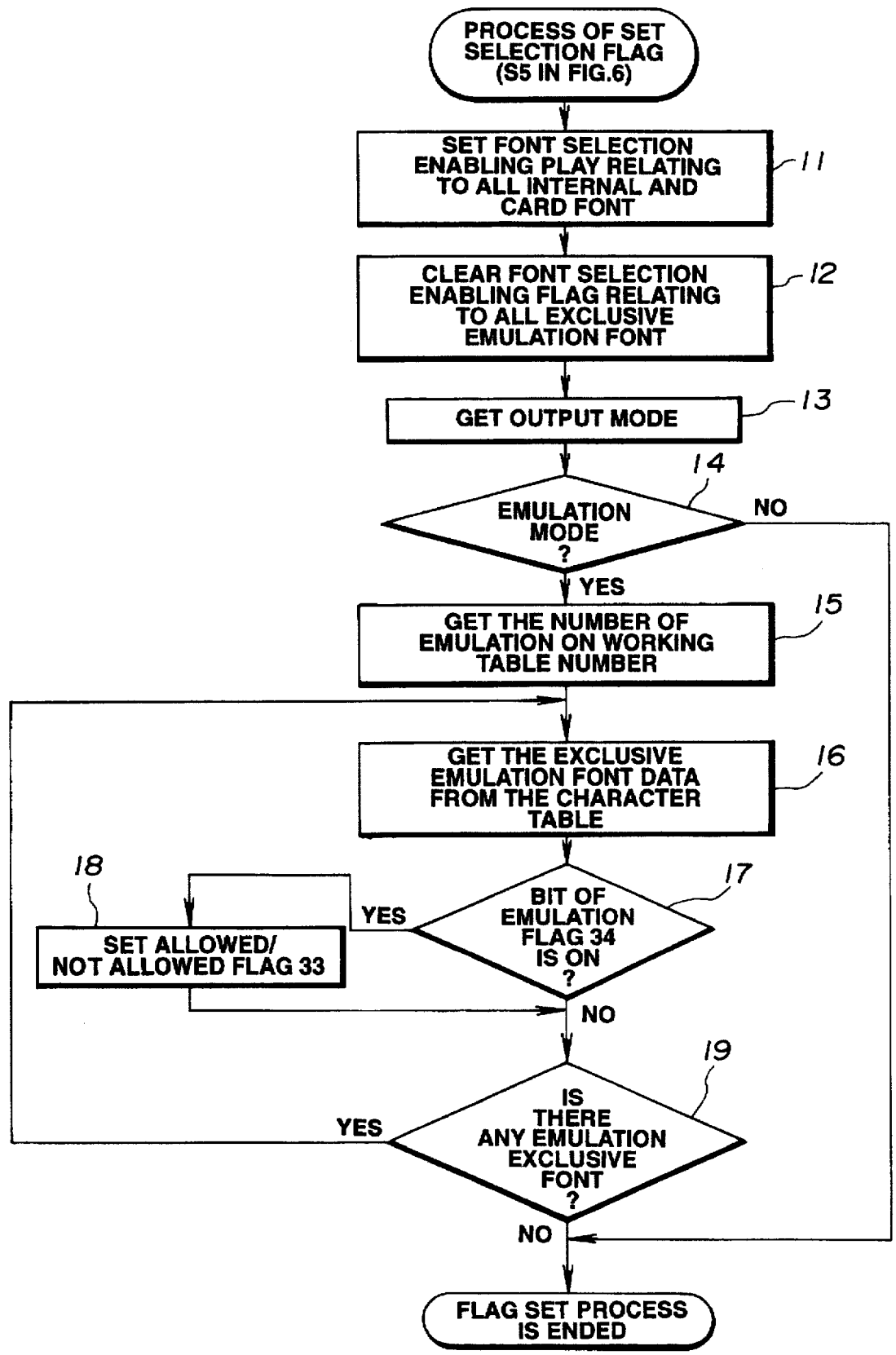
FIG. 7 is a flow chart showing a process of controlling a font selection enabling flag.

FIG. 2 is a block diagram showing the control components of a printing apparatus. 100 is the main body of the printing apparatus. 101 is a printer controller. 2 is a host computer, which supplies data to the printer 1. 3 is a CPU which controls each process in the printer 1. 4 is an input interface which receives and stores data from the host computer 2. 5 is a program ROM which stores control programs illustrated in FIGS. 6 and 7. 6 is a font ROM which stores a scalable font (one in which a character is described by stroke information, not dot information) in accordance with an input character code. 7 is an internal RAM which stores a emulation table 20 and character set table 30. 8 is an output unit for printing characters on paper. 9 is a card interface which takes card font data and an emulation program from a memory card (not shown) which is installed in the printer 1.

FIG. 3 is a schematic block diagram of data of an emulation table. Many kinds of information, described in FIG. 3, are stored in the emulation table 20. The information is supplied internally by the printer or by the card. A table number portion 21 contains a specific register number for each emulation program in the emulation table 20. An emulation program address portion 22 shows the beginning address of each emulation program in, for example, the program ROM 5. The name of each emulation program is stored in an emulation name portion 23. An identifying number for each emulation program is stored in an emulation identifying number portion 24. Any other needed information on each emulation program is stored in an "other information" portion 25. Upon reference to the emulation table 20, the desired emulation program is executed.

In FIG. 3, the emulation table 20 shows that five emulation programs A, B, C, D and E, which respectively have emulation identifying numbers 10, 20, 30, 40 and 50, are stored in the emulation, table of the printing apparatus.

Figures 4A, 4B:
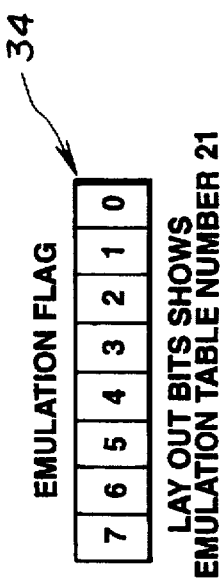
FIGS. 4(a) and 4(b) are schematic diagrams illustrating data in a character set table.

FIGS. 4(a) and 4(b) are schematic diagrams of data of a character set table. In the character set table 30 (FIG. 4(a)), the addresses of internal fonts of the printing apparatus are registered, and information shows in which emulation program each font is usable.

A font address 31 shows the head address of each font registered.

A font information flag 32 includes two flags. One of them shows whether a font datum denotes "internal font", "card font" or "exclusive font of emulation". The other flag is for distinguishing font data from each other. In producing pattern data process, the distinguishing flag in the character set table 30 is useful for designating a font. A font selection enabling flag 33 shows whether each font datum is usable in the present output mode. A emulation flag 34 shows which emulation cards can use the various font data.

Each bit number of the emulation flag 34 corresponds to a table number 21 as shown in FIG. 4(b). For example, if bit 0 of an emulation flag in relation to given font data is "1", emulation program A which corresponds to the table number 21 (number "0") can use the font data.

Figure 5:
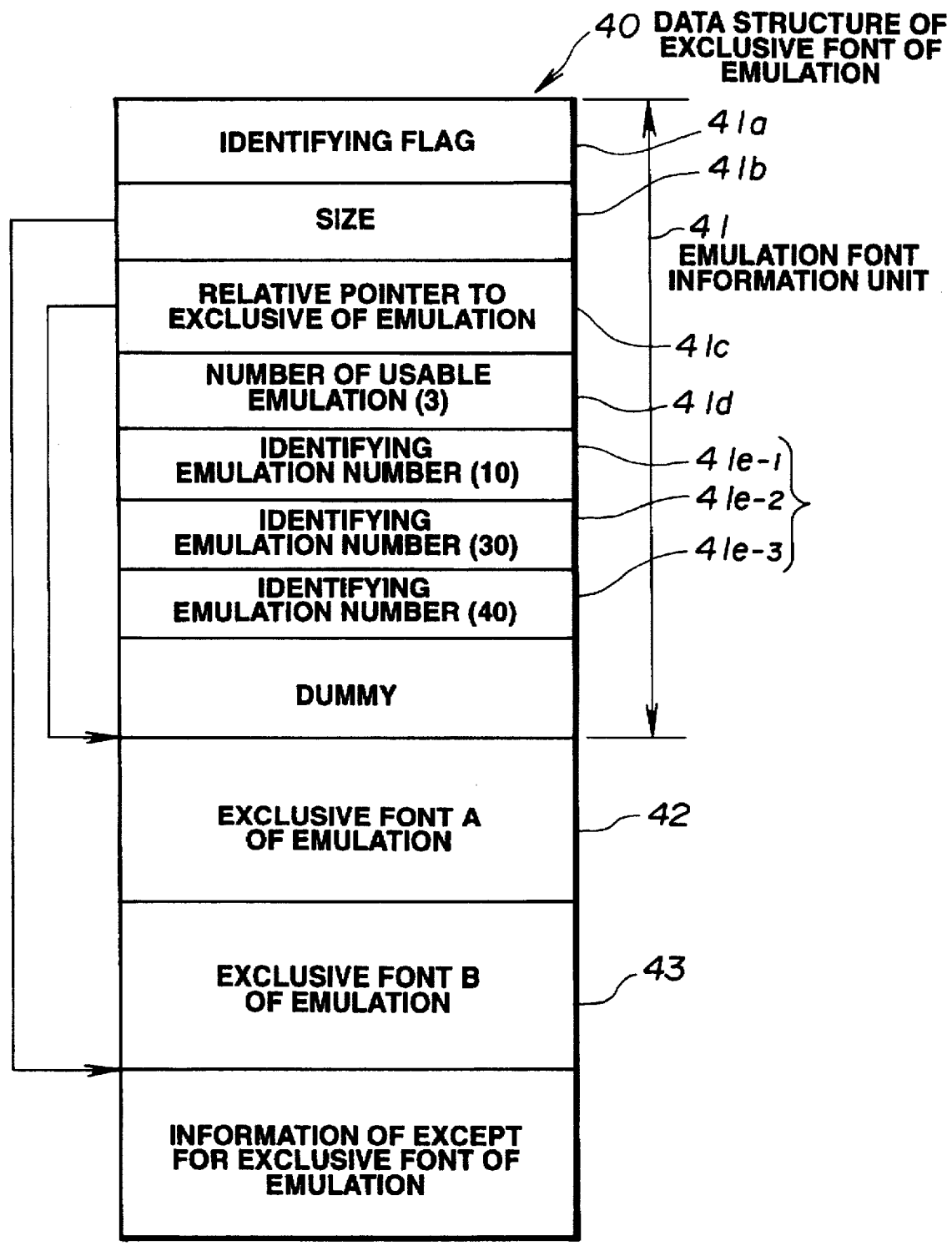
FIG. 5 is a schematic diagram illustrating data in an exclusive font for an emulation program.

FIG. 5 is a schematic diagram illustrating data of an exclusive font for an emulation program.

The exclusive font is installed with the emulation information, or is stored in the ROM 6.

An emulation font information unit 41 includes an identifying flag 41a, size information 41b, a relative pointer for exclusive font of emulation 41c, the number of usable emulations 41d, and an identifying emulation number 41e.

The identifying flag 41a is for identifying the emulation font information unit 41 from others. The size information 41b shows the size of the information unit 41 and exclusive fonts of emulations A and B. The relative pointer to exclusive font of emulation 41c shows the address of the stored exclusive font of emulation A (reference character 42) or B (reference character 43). The number of usable emulations 41d identifies how many emulations can use the font data. The identifying emulation number 41e indicates the emulation identifying numbers (24 in FIG. 3) designated by the number of usable emulations 41d. In FIG. 5, the number of usable emulations 41d is 3. Thus, there are three identifying emulation numbers, "10", "30" and "40".

In the data format shown in FIG. 5, the emulation font information unit 41 of the exclusive font A and B of emulation has been described. FIGS. 6 and 7 are flow charts showing steps of the first embodiment of the printer apparatus as described above.

FIG. 6 is a flow chart showing a process of taking exclusive font data in the first embodiment. A program of the flow chart is stored in ROM 5.

When power is supplied to the printing apparatus 100, an initial process is executed, as are the processes of reading emulation, in step 1, and reading internal and card fonts, in step 2 of FIG. 6.

In step 1, information related to a usable emulation program in the printing apparatus 100 is registered in the emulation table 20 of the RAM 7. The CPU 3 executes them. In step 2, information related to the inner font and the card font is registered in the character set table 30 of the internal RAM. The registered information in step 1 or step 2 is related to the normal font data. Therefore, the value of the emulation flag has no meaning.

In step 3, the exclusive font of emulation is read and registered in the character set table 30 in FIG. 4. As mentioned above, the exclusive font of emulation handles the emulation font information. Thus, the information shown in FIGS. 4(a) and 4(b) is stored.

In the emulation font information unit 41, the identifying emulation numbers 41e are stored. The CPU 3 can identify a usable font for each emulation program, in accordance with this information. In this embodiment, when the information of the exclusive font of emulation is registered in the character set table 30, the CPU 3 controls each bit of the emulation flag 34 in FIG. 4(a) in accordance with the information. For example, the CPU 3 understands that the adequate emulation programs which have the identifying emulation numbers 10, 30 and 40 in FIG. 5 can use the registered exclusive emulation font. The CPU 3 reads the table number 21 (0, 2, 3) in FIG. 3 identifying the emulation programs which are applicable. Finally, the CPU 3 sets three bits of the emulation flag 34 in FIG. 4 in accordance with the table numbers 0, 2 and 3.

In step 4, the CPU 3 shifts output mode to an output mode designated by the user. There are: a mode which produces a pattern by means of a printer language stored in the printing apparatus 1; and another mode which produces a pattern by means of another printer language which is supplied by an emulation program. The CPU 3 clears (ON→OFF) the font selection enabling flag in character set table 30 in step 5 at every shifting in step 4.

A process of setting the font selection enabling flag in character set table 30 is described in FIG. 7, below. The CPU 3 executes the designated output process in step 6 with a suitable font.

When selecting a font in each output mode, the CPU 3 always refers to the font selection enabling flag 33. In this way, an emulation program can use the exclusive fonts which are usable with that emulation program, in accordance with the font selection enabling flag 33. The CPU 3 determines whether a command for shifting from one output mode to another has been input or not. If such a command is input, the flow in FIG. 6 returns to step 5. The CPU 3 clears (ON→OFF) the font selection enabling flag in character set table in FIG. 5 again, and the CPU 3 executes a process of each output mode (steps 6 and 7 in FIG. 6). If NO in step 7 in FIG. 6, the flow returns to step 6 and the process is continued. When power is turned off or a command for shifting is input, the flow is out from step 6.

FIG. 7 is a flow chart showing a process of controlling a flag which shows whether a font in a character set table is able to be selected or not (step 5 of FIG. 6).

In step 11, the CPU 3 sets (ON→OFF) the font selection enabling flag 34 in character set table 30 in FIG. 5 in correspondence to ordinary fonts (internal fonts and card fonts).

The CPU 3 can distinguish the internal font from card font by the font information flag 32 in FIG. 4 in step 11. The CPU 3 clears (ON→OFF) the font selection enabling flag 34 in correspondence to the registered exclusive font of emulation. The CPU 3 can distinguish the exclusive font of emulation from others by the font information flag 32 in FIG. 4 in step 12. The CPU 3 gets information about next output mode in step 13.

The CPU 3 determines whether the output mode is an emulation mode in step 14. If YES in step 14, the flow advances to step 15. The CPU 3 sets up an emulation font in step 15–step 19. If NO in step 14, this flow finishes.

The CPU 3 gets the number of emulation table number 21 of a emulation program in step 15. The CPU 3 reads the emulation flag 34 of the exclusive font of emulation in the character set table 30 in step 16. The CPU 3 determines whether the bit which corresponds to the table number 21 is set or not in the emulation flag 34. If YES in step 17, the CPU 3 sets (ON→OFF) the font selection enabling flag 33 corresponding to the table number 21. Thus, the CPU 3 enables the exclusive font of the emulation program in question to be used in step 18.

If NO in step 17, the CPU 3 understands that the exclusive font in question can't be used in this output mode. As mentioned above, the font selection enabling flag 33 is cleared so that the CPU 3 has this information. The flow advances to step 19. The CPU 3 determines whether there are other emulation programs to be processed. If YES in step 19, the flow returns to step 16. The process as described is repeated for such other emulation program. If NO in step 19, the flag setting process (FIG. 7) is finished.

As mentioned above, in this embodiment, the CPU 3 can permit exclusive font data to be used in some common emulation modes or can permit exclusive font data to be used in a specific emulation mode in accordance with the specific information contained in the font information.

Furthermore, in this embodiment, the exclusive font information includes the identifying emulation number which shows which emulation program can use it. Thus, the emulation flag can be stored in the character set table in accordance with the identifying emulation number.

At each shifting of output mode, the CPU 3 controls the font selection enabling flag in accordance with the emulation flag.

In this embodiment 1, the CPU 3 sets the emulation flag 34 in the character set table 30 in accordance with the identifying emulation number 41e registered in the emulation font information unit 41. The CPU 3 also determines whether the exclusive font of emulation can be used or not, with each working emulation program. But this process is not limited to this exact arrangement. For example, the CPU 3 can determine whether the exclusive font of emulation can be used by directly reading the identifying emulation number in the emulation font information unit 41. In any case, this invention affords flexible font selection by including information which specifies an emulation program that can use exclusive font data, in the emulation font information.

(Second Embodiment)

In the first embodiment, as described above, a process related to a ROM font is used. But in the second embodiment, the emulation flag in the character set table is applied to a non-internal font produced by a user.

A registered non-internal font of an emulation program can be kept from use by another emulation program, by applying the emulation flag to the non-internal font.

Figure 8:
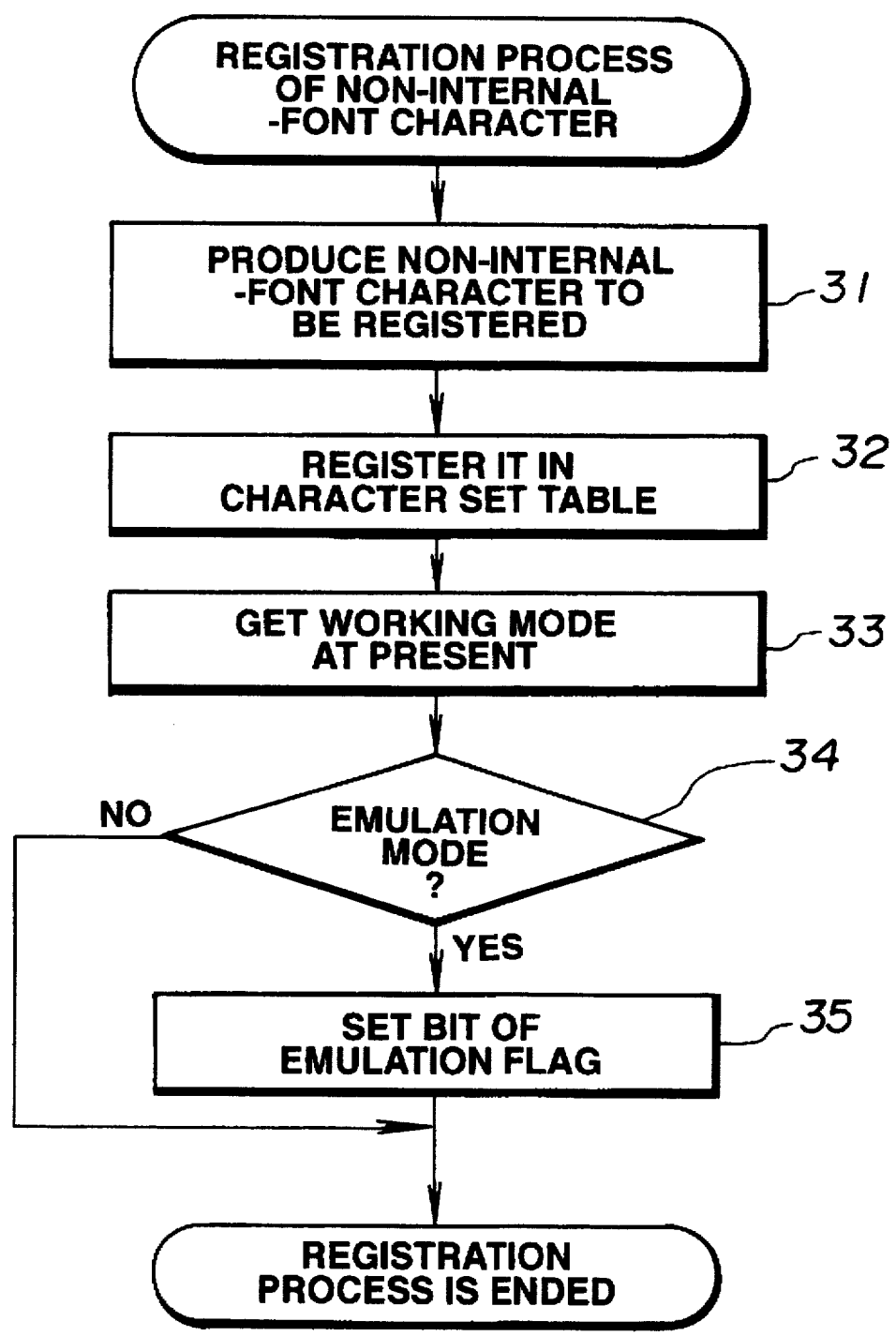
FIG. 8 is a flow chart showing a process of registering a non-internal-font character in a second embodiment.

In the second embodiment, the CPU 3 sets a bit of the emulation flag 34 corresponding to the emulation table number of a emulation program which is in use when a produced non-internal font cannot be used by another emulation program. This embodiment will be further described with reference to FIG. 8 showing a process of registering a non-internal font. In step 31, a desirable non-internal font is produced in accordance with an indication by the user.

In step 32, the CPU 3 registers information such as address and font information about the produced non-internal font in the character set table 30.

In step 33, the CPU 3 learns the output mode at present by reading the table number 21 in FIG. 3. If that mode is non-emulation mode, the CPU 3 can so ascertain by reading "−1" from the table number 21.

In step 34, the CPU 3 determines whether the output mode at present is an emulation mode or not in accordance with the information in step 33. If YES in step 34, the flow advances to step 35. The CPU 3 sets the emulation flag 34 in accordance with the output mode at present, which is illustrated in step 33, and the process is finished. If NO in step 34, the process is already finished. As mentioned above, the CPU 3 can control the flag of the emulation flag 34 in relation to the non-internal font. After this, the CPU 3 can control the font selection enabling flag 33 of the character table 30 in FIG. 7. This ensures that the non-internal font of an emulation program can't be used for another emulation program.

As mentioned above, when a non-internal font which is produced by a user for a emulation program is registered, a flag shows which emulation program can use it is stored in the character table 30. Thus, the non-internal font can be used for the enabled emulation program. Furthermore, this invention can be applied to a host computer if data for printing is converted to dot data in the host computer.

The present invention may be applied to a system constituted by a plurality of devices or an apparatus constituted by one device. In addition, the present invention can be achieved by supplying a program to the system or apparatus.

As mentioned above, each font datum contains information specifying an emulation program which can use it. So in each output mode, the system determines whether each font can be used or not. The present invention thus supplies a flexible font selection function.

What is claimed is:

1. A print control apparatus comprising:
    storage means in which are stored a plurality of emulation fonts including determination information for determining whether the font may be used in a given emulation mode;
    designating means for designating an emulation mode from among a plurality of emulation modes;
    setting means for setting selection flags in said storage means to set the emulation fonts which can be used in the designated emulation mode in accordance with the determination information; and
    executing means for selecting an emulation font based on a set section flag and executing a print process in the designated emulation mode;
    whereby an exclusive font is prevented from being used in an emulation mode for which it was not authorized.

2. An apparatus according to claim 1, further comprising printing means for printing using the selected emulation font in a printing process in the designated emulation mode.

3. An apparatus according to claim 2, wherein said printing means comprises an ink jet printer.

4. An apparatus according to claim 2, wherein said printing means comprises an electrophotographic printer.

5. An apparatus according to claim 1, further comprising a host computer which supplies printing data.

6. An apparatus according to claim 1, wherein said setting means sets a flag for each of the emulation fonts, said flag indicating whether the emulation font can be used in the designated emulation mode.

7. An apparatus according to claim 1, wherein said setting means sets the emulation fonts that may not be used when an ordinary mode is designated.

8. A print control method used in a print control apparatus comprising storage means in which are stored a plurality of emulation fonts including determination information for determining whether the fonts may be used in a given emulation mode, comprising the steps of:
    designating an emulation mode from among a plurality of emulation modes;
    setting selection flags in said storage means to set the emulation fonts which can be used in the designated emulation mode from among the plurality of emulation fonts; and
    selecting an emulation font based on a set selection flag and executing a print process in the designated emulation mode;
    whereby an exclusive font is prevented from being used in an emulation mode for which it is not authorized.

9. A method according to claim 8, further comprising the step of printing a character by a printing means using the selected emulation font for printing in the designated emulation mode.

10. A method according to claim 9, wherein the printing means comprises an ink jet printer.

11. A method according to claim 9, wherein the printing means comprises an electrophotographic printer.

12. A method according to claim 8, further comprising the step of supplying printing data from a host computer.

13. A method according to claim 8, wherein said setting step sets a flag for each of the emulation fonts, said flag indicating whether the emulation font can be used in the emulation mode designated in said designating step.

14. A method according to claim 8, wherein said setting step sets emulation fonts that may not be used when an ordinary mode is designated.

15. Apparatus according to claim 1 wherein said storage means is a character set table.

16. Apparatus according to claim 1 wherein said enabling flag is a font selection emulating flag.

17. A method according to claim 8 wherein said storage means is a character set table.

18. A method according to claim 8 wherein said enabling flag is a font selection enabling flag.

* * * * *

UNITED STATES PATENT AND TRADEMARK OFFICE
CERTIFICATE OF CORRECTION

PATENT NO. : 5,684,930

DATED : November 4, 1997

INVENTOR(S): YASUSHI MOCHIZUKI

It is certified that error appears in the above-identified patent and that said Letters Patent is hereby corrected as shown below:

Item
[63] RELATED U.S. APPLICATION DATA

"Continuation-in-part" should read --Continuation--.

COLUMN 8

```
Line 3,  "selection" should read --font selection--.
Line 8,  "section"   should read --font selection--.
Line 33, "selection" should read --font selection--.
Line 37, "selection" should read --font selection--.
Line 61, "emulating" should read --enabling--.
```

Signed and Sealed this

Ninth Day of June, 1998

Attest:

BRUCE LEHMAN

Attesting Officer    Commissioner of Patents and Trademarks